Nov. 15, 1966  A. S. TAYLOR  3,285,903
COLLAGEN FILM
Filed May 24, 1962
2 Sheets-Sheet 1
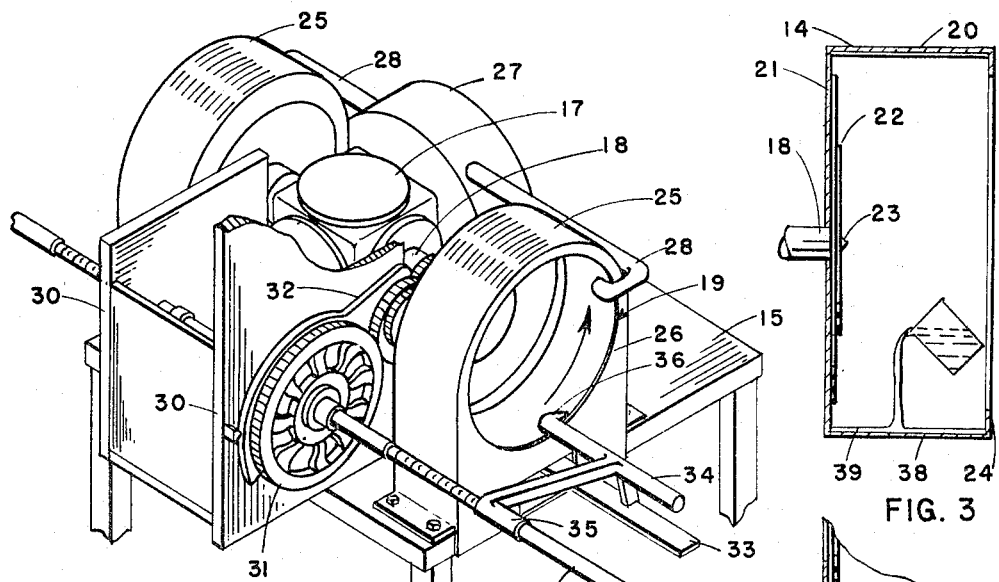
FIG. 1
FIG. 3
FIG. 4
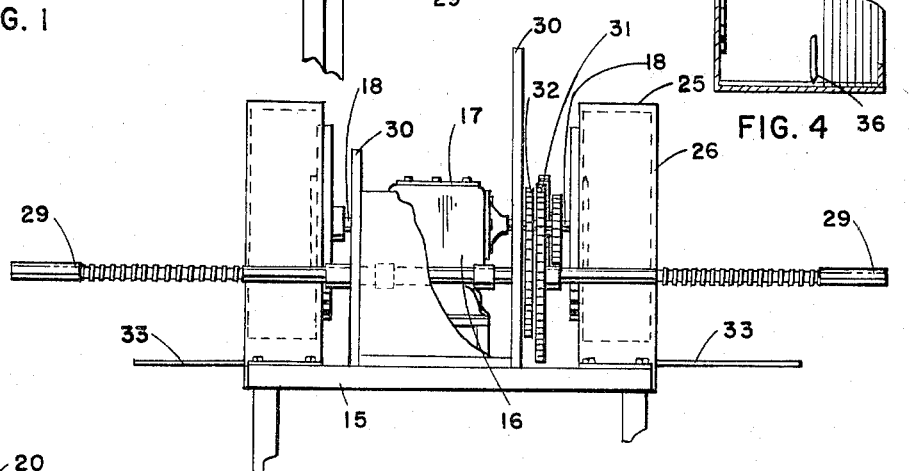
FIG. 2
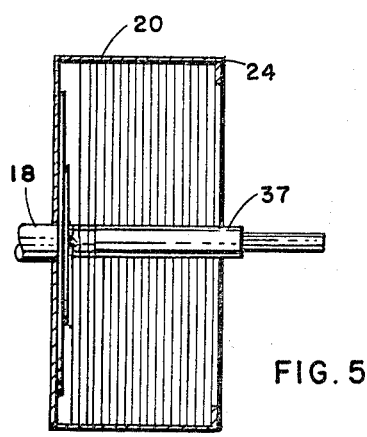
FIG. 5
INVENTOR.
ARTHUR SINCLAIR TAYLOR
BY
Samuel Branch Walker
ATTORNEY Nov. 15, 1966   A. S. TAYLOR   3,285,903
COLLAGEN FILM Filed May 24, 1962   2 Sheets-Sheet 2

INVENTOR.
ARTHUR SINCLAIR TAYLOR
BY
Samuel Branch Walker
ATTORNEY

United States Patent Office 3,285,903
Patented Nov. 15, 1966

3,285,903
COLLAGEN FILM
Arthur Sinclair Taylor, Spring Valley, N.Y., assignor to American Cyanamid Company, Stamford, Conn., a corporation of Maine
Filed May 24, 1962, Ser. No. 197,330
1 Claim. (Cl. 260—123.7)

This is a continuation-in-part of application Serial Number 704,730, filed December 23, 1957, now United States Patent No. 3,036,341, dated May 29, 1962, entitled Centrifugal Casting of Collagen Films and Ribbons.

This invention relates to an oriented collagen film of uniform thickness, cast as a sheet, and which may be slit into ribbons.

Surgical sutures have normally been made from thin long tissues found in the intestinal tract of animals.

For purposes of the present description the term "sutures" includes also ligatures. These terms in the medical profession are more descriptive of the use of the strands than their composition. Ligatures are used to tie off blood vessels and the like. Sutures are used to sew or tie together various tissues. The term "sutures" is used in this specification to refer to both.

There is a limited supply of suitable intestinal tissues and these tissues are not uniform and are difficult to separate and handle.

It would, therefore, seem obvious that a mechanical process giving uniform materials of uniform cross-section and of greater length than obtainable from animal's tissues would have advantages. Attempts have been made to prepare sutures with such characteristics, but such previously known processes have involved unduly complicated casting and slitting procedures.

One class of sutures is prepared from substantially pure collagen as found in the animals' intestinal tract. A collagen of similar and suitable characteristics is found in animal tendons and other animal tissues. This collagen is separated from extraneous tissue material for reformation into strands of the proper characteristics for surgical uses. The problem of fluidizing the collagen, casting the fluidized collagen in suitable films, and regenerating has been described. One of the big problems has been a method of casting such that the ribbons or strands have a suitable, uniform cross-section.

6–0 sutures are defined by the U.S. Pharmacopeia XV as having a diameter of not less than 0.0025 inch and not greater than 0.0045 inch. 4–0 strands have a minimum diameter of 0.0070 inch and a maximum of 0.0095 inch. As can be seen, a strand having this size is rather delicate to cast.

Additionally, the medical profession desires sutures of a maximum strength. The strength of a suture of uniform composition is determined by the area of the smallest cross-section. For maximum strength, a suture must have a uniform cross-section and preferably a cross-section of as large as possible within the size classification so that the suture will have maximum strength. The fluidized collagen has been cast as ribbons but it has been difficult to secure a completely uniform ribbon which would meet acceptable standards when twisted into a suture. One method of preparing a fluidized collagen and casting is described in United States Patent 2,747,228, Braun et al., Production of Collagen Strands, May 29, 1956.

It has now been found that a thicker fluidized collagen may be cast and a more uniform fluidized collagen film may be cast by centrifugally casting the fluidized collagen than by previous methods. In casting on the external surface of a drum or on a continuous strip, only the force of gravity and the surface tension of the casting material act to insure uniformity, and control the dimensions of the cast film. When centrifugally cast much greater centrifugal forces may be used for purposes of control. Additionally by using a centrifugally formed casting surface greater uniformity may be obtained.

In practice a hollow casting drum is used, either mounted on a shaft, or centerlessly supported, in which a hollow rotating drum having a cylindrical drum face with annular rims on each side of that face is spun at a rate of speed such that materials placed in the drum will be held against the drum face by centrifugal force. Greater speeds give greater force to insure uniformity of the cast material. A higher speed may be used for the casting step than during subsequent drying.

It is desirable that the casting surface be concentric with the axis of rotation of the drum. This is achieved by using a separate liquid which is also centrifugally cast in the drum and therefore any mechanical eccentricities are self-compensating because the casting surface is formed under the same type of conditions as the collagen film and hence both practically and theoretically the collagen film must be of uniform thickness. Preferably the casting surface is a wax which is introduced into the drum, thus forming a surface which is absolutely concentric with the axis of rotation. As will be later described, the cast film is helically cut to form a ribbon. If a sheet is desired, the cast film may be removed before the helical casting. In this cutting it is difficult to cut through just the film and no more. With a wax support it is very convenient to cut through the film and part way into the wax, as later described, which after removal of the ribbon leaves a residual wax surface with a cut spiral groove therein. A heat source such as a torch is introduced into the drum and directed on to the grooved surface of the wax to melt the wax while the drum is spinning. By remelting the wax a fresh concentric surface is formed. After all of the surface irregularities are melted out, the torch is removed and the thus remelted wax again assumes a smooth, uniform, concentric surface.

On the original or remelted smooth wax concentric surface is placed, by spraying or pouring, the fluidized collagen. The fluidized collagen is spread by centrifugal force smoothly and uniformly over the casting surface and, as it, too, is subjected to the same centrifugal force as was the wax forming the casting surface, this liquefied collagen is spread as a uniform film. By rotating at a somewhat higher speed than is necessary to merely retain the liquefied collagen in position, centrifugal forces greater than gravity are brought into play thus insuring that the cast film of collagen is free from air bubbles and other discontinuities. At slower centrifugal speeds or with thicker collagen formulations a small scraper may be used as a doctor to assist in spreading the fluidized collagen more rapidly. The collagen film is then hardened. Usually the collagen mass is an aqueous suspension or solution and is hardened by the evaporation of water therefrom. An air blast is supplied to the interior face of the drum to speed drying. After the film has dried, the rapid rotation of the drum is stopped, the film cut in a helix, and the long ribbon of collagen thus formed is removed.

It is preferred that the wax be one to which the collagen film adheres slightly during drying to reduce the tendency of the film to pull loose from the wax due to shrinkage stresses. The liquefied collagen may be of any of the known liquefied forms but conveniently is an acid swelled collagen and may have such plasticizers as polyethylene glycol or glycerine added thereto while in liquefied form. The liquefied form of collagen may either be a true solution or gel or suspension of collagen particles in water. Preferably the solids content is kept as high as is consistent with convenient manipulation so that the amount of water and hence the drying time is minimized.

While it is to be understood that any convenient form of drum, support means for the drum, and drive means for the drum may be used, certain specific modifications are illustrated in the following description and accompanying drawings:

FIGURE 1 is a pictorial view in partial section of a double drum centrifugal casting machine.

FIGURE 2 is a front view of the double drum casting machine.

FIGURE 3 is a view of the pouring of the fluidized collagen in a single drum.

FIGURE 4 is a partial view of helically cutting the dried collagen film.

FIGURE 5 shows the winding of the finished ribbon from the casting surface on to a mandrel.

MODIFICATION I

Figure 6:
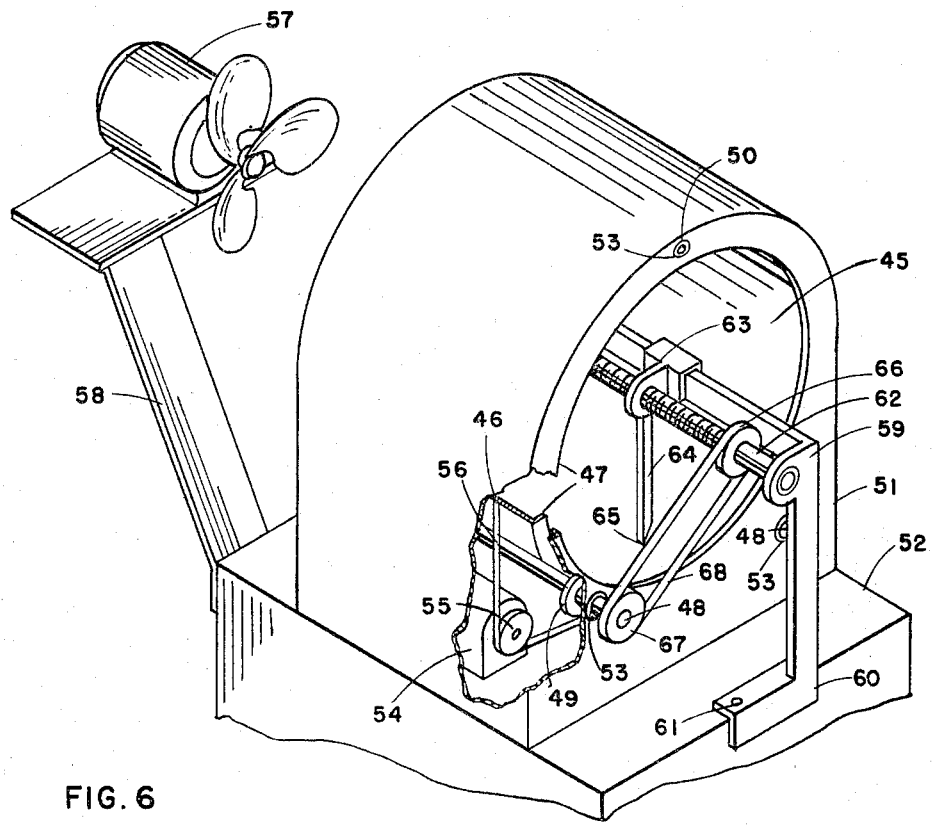
FIGURE 6 is a partially cut away pictorial view of a single drum centerless casting machine.

As shown in FIGURE 1, on a support frame 15 is mounted an electric motor 16 attached to a reduction gear drive 17. The reduction gear drive 17 has extending from it two drum support shafts 18. On each drum support shaft is an open-ended drum 19. The drum consists of a drum face 20 which is attached to an end disc 21 which is in turn mounted on the drum support shafts 18. The end disc may also have reinforcing discs 22. The shaft has a center 23 which is accessible from the interior of the drum. This center may be either male or female but as shown in FIGURE 3 is a male center. At the other side of the drum face is an annular rim 24. The inside or working side of the drum face is accessible through the hole in this annular rim. As shown in FIGURE 1 a safety housing 25 may be placed over the drum with a housing aperture 26 to permit access to the interior of the drum. While not necessary the safety housing is desirable to prevent accidental entanglements of the operators with the rotating drum.

Also driven by the reduction gear drive or other means is a blower 27 which blows air through ducts 28 into the interior of the drums. Parallel to the drum support shaft 18 is a threaded shaft 29 which is journalled in threaded shaft support plates 30. This threaded shaft extends beyond the open-ended drums on each side. While other forms of threads may be used, an Acme thread is preferred for this shaft. The threaded shaft is driven by a disengageable reduction gear train 31 from the drum support shaft 18. Conveniently, but not necessarily, part of the gears in this train are supported on a gear train arm 32. This gear train arm may be disengaged so that the reduction gear train and threaded shaft are only rotated when needed.

Extending from the support frame 15 is a knife guide 33 which is below and parallel to the drum support shafts. A knife frame 34 has a long half nut 35 adapted for resting on and engaging the threaded shaft 29. The half nut is long enough so that it bears on the threaded shaft and is aligned by contact with the threaded shaft. The knife frame 34 is disengageable guided by the knife guide 33 so that the knife frame is supported and positioned by the knife guide and the threaded shaft and as the threaded shaft turns, the knife frame is uniformly advanced along the thread. At the end of the knife frame is a sharp cutting knife 36 which extends down towards but does not quite touch the inside of the drum face 20.

When the knife frame is in position, the reduction gear train engaged, and the drum slowly rotated, the knife point traces a helix very similar to the action of the cutting tool in a lathe. Disengageable with the center 23 is a mandrel 37. The mandrel can be attached to one end of a ribbon after it is cast, positioned on the center, and as the drum rotates, the ribbon is stripped off the wax of the drum and wound on the mandrel as shown in FIGURE 5.

Preferably the motor 16 or the reduction gear drive 17 has at least two speeds, one for high speed driving of the drum during the casting operation and a lower speed for use during the cutting and winding operations.

Example 1

As illustrative of the use of the present machine, drums having a diameter of approximately 12 inches are rotated at 1760 revolutions per minute. A wax is prepared by mixing 15% of cellulose acetate butyrate such as sold by Tennessee Eastman as type EAB–381–20 (20 second viscosity) with 85% acetylated monoglycerides such as is sold by Distillation Products Industries under the trademark "Myvacet" by melting together at 150° C. with stirring. This type composition is mentioned in Industrial and Engineering Chemistry, 46, 13A–15A (September 1954). The hot wax is poured into the rotating drum to form a layer about 3 millimeters thick. Air from the blower is directed onto the cast wax to chill the surface. In its molten state the wax spreads uniformly over the interior face of the drum to give a centrifugally cast forming surface 38 on the wax 39. This centrifugally cast forming surface is necessarily concentric with the axis of rotation of the drum.

A composition is prepared containing 0.75% dry solids of acid swelled collagen gel. This is prepared by selecting cattle tendons, washing the tendons free from salt, flesh, and foreign matter, then disintegrating in water in a mill. The mixture is diluted to 0.75% dry solids and acidified with hydrochloric acid to a pH of 3.5. 5% by weight of dry solids of polyethylene glycol having an average molecular weight of 400 is added. 450 milliliters of this composition is poured into each drum as the drum is rotated as shown in FIGURE 3. Rotation is continued as air is blown into each drum, until the water is evaporated forming a thin film of collagen. This is usually accomplished in six hours, but the centrifuge may be run overnight. The drums are stopped, the cutting knife on the knife frame is introduced near one edge of the drum, the reduction gear train is engaged, and the drum is rotated at a speed of about 60 revolutions per minute as the knife advances cutting the film into ribbon about 3 millimeters wide. After the knife has traversed the entire face of the drum, a similar cutting is made in the other drum. One end of the ribbon is disengaged, attached to a mandrel and the drum rotated slowly as the mandrel is held in position in the center of the drum as shown in FIGURE 5 pulling the ribbon free from the cast surface and wrapping the ribbon about the mandrel.

The casting surface is wiped with a damp rag to remove any fragments of collagen or other debris. A gas torch is introduced into the drum and played against the surface of the wax therein as the drum is rotated until the wax melts sufficiently to remove the evidence of the cutting knife as it penetrated through the film into the wax, then heat is discontinued and the drum is allowed to rotate at centrifugal speed until the wax film has solidified. The surface is then in condition for another film casting operation.

The ribbon of regenerated collagen is rinsed with acetone to remove any adherent wax, wiped dry, and twisted into a suture. The suture may be stretched slightly, chromicized, or otherwise treated, to have the final characteristics desired.

*Example 2*

Example 1 is repeated using glycerine instead of polyethylene glycol as the plasticizer. A good suture is produced.

MODIFICATION II

Another modification of the machine of this invention is shown in FIGURE 6 in which a centerless drum 45 consisting of a drum face 46 having an annular rim 47 at each end thereof is supported by single flanged wheels 49 on shafts 48 and held down by wheels on a hold down shaft 50 which are supported by a safety housing 51 on a table 52. Conveniently, but not necessarily the wheels are attached to the shafts and the shafts rotate in bearings 53. The single flanged wheels, like the flanged wheels of railway cars, support the drum for rotation and restrain the drum from axial motion. Adjacent to the drum is a multiple speed motor 54 having thereon a pulley 55. A belt 56 passes around the pulley 55 and the centerless drum 45 thus rotating the drum. The housing 51 is open at both ends thus serving to permit access to the interior of the drum, air flow through the center of the drum, and yet protects operators from accidential contact with the drum.

Adjacent to one end of the drum is a fan 57 on a fan support 58 to blow air through the drum. A disengageable knife guide 59 is mounted on a guide support 60 which engages an edge of the table and is positioned by a dowel 61. A similar support is at each end of the knife guide. Journalled in the guide supports is a threaded shaft 62 on which is mounted a threaded knife carrier 63 which also slides on the knife guide 59 and is positioned thereby. From this carrier extends a knife arm 64 on the end of which is a cutting knife 65. This cutting knife is long enough to extend through a cast film part way into a centrifugally cast wax in the drum but not be dulled by contact with the drum. Adjacent to one end of the threaded shaft is a threaded shaft pulley 66. On one of the shafts 48 is a drive pulley 67. Between these pulleys is a belt 68. Preferably the knife assembly is symmetrical so that it may be driven in one direction during one operation then reversed and driven back in the next cutting operation so that it is unnecessary to reposition the knife carrier on the threaded shaft after a cutting operation.

*Example 3*

A 36 inch drum is rotated at 700 revolutions per minute. In this drum is poured sufficient wax to form a layer about a quarter of an inch thick. The wax used is a synthetic acetylated glycerol monostearate of 98% purity. The wax is allowed to cool and solidify while the drum is spinning. A 1% dry solids liquefied collagen is prepared by shredding 600 grams of beef tendons, about 200 grams dry solids content, and mixing with enough water and 50 milliliters of 3 normal hydrochloric acid to give 20 liters of final solution, the mixture is stirred, and passed through a grinding mill. The mixture after standing overnight is then added to the spinning drum in sufficient volume to give a dried film 1/1000 inch thick. Air is blown through the rotating drum until the collagen dries to a film, about 12 hours is required.

In common with many forms of film formation, such as papermaking, the film as cast is stronger in the direction of casting than in the cross direction. Strips 1/4" wide and 2½" long, cut from cast film tested:

| Thickness | Plane of Rotation, Pounds | Perpendicular, Pounds |
|---|---|---|
| 0.0015" | 7.0 | 5.2 |
|  | 9.4 | 4.5 |
|  | 7.1 | 3.1 |
|  | 7.7 | 4.2 |
|  | 8.1 | 4.1 |
|  | 7.7 | 3.6 |
|  | 7.8 | 4.3 |
|  |  | 3.3 |
|  |  | 4.6 |
| Average | 7.9 | 4.1 |
| 0.0028" | 17.8 | 16.0 |
|  | 16.3 | 11.8 |
|  | 17.0 | 7.5 |
|  | 20.8 | 12.0 |
|  | 23.3 | 12.5 |
|  | 19.4 | 12.0 |

Breaking strength in tension.

The tests show the film to be more uniform in the plane of rotation, and markedly stronger. As contrasted with such arts as papermaking, where uniform strength is desired, or longitudinal strength of the split ribbon is of primary importance and the cross-direction strength is of much less importance.

Figure 7:
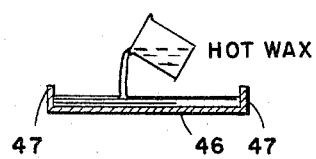
FIGURE 7 is a diagrammatic view showing the pouring of the hot wax into the drum.
Figure 8:
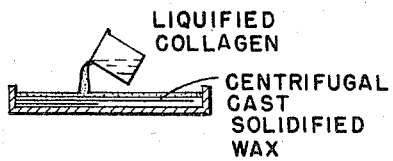
FIGURE 8 shows the pouring of the liquid collagen on to the centrifugally cast solidified wax surface.
Figure 9:
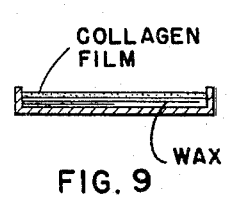
FIGURE 9 shows the dried collagen film on said wax surface.
Figure 10:
FIGURE 10 shows the spiral cutting of the collagen film.
Figure 11:
FIGURE 11 shows a torch remelting the centrifugally cast solidified wax surface.

The knife carrier assembly is positioned and a helix cut by rotating the drum at a slow speed of about 20 revolutions per minute as the knife cuts through the dry film and part way into the supporting wax. The pouring of the wax is shown in FIGURE 7, the casting of the liquid collagen in FIGURE 8, and the spiral cutting is shown in FIGURE 10.

After the entire film is cut to a helix, the knife assembly is removed, a mandrel placed inside the drum and the ribbon is wound on the mandrel. The ribbon is ready for subsequent processing.

The interior of the drum is wiped with a damp cloth to remove any loose fibers, etc.

High speed rotation of the drum is resumed and a group of burners introduced into the interior of the drum to melt the wax surface until the grooves formed by the cutting knife are removed and a smooth interior surface again formed. The flame is removed and the wax permitted to harden; after which the machine is ready for the next casting operation.

The ribbon may be subsequently processed in accordance with conventional procedures as, for example, acetone wiping to remove wax, stretching, chromicizing, and twisting. A plurality of ribbons may be twisted together in a slightly moistened condition to form larger strands. The strands for the sutures may either be processed in the as-cast length or cut into convenient segments for individually processing as individual sutures.

As will be obvious, many modifications may be made in the process and apparatus, such as the casting speed may vary, the methods of introducing, cooling, and drying air may be varied, and the time of cycles varied over a wide range depending upon the temperature of the drying air, the relative humidity of the drying air, the velocity of the drying air, and the thickness of the cast film. Thin films are particularly useful for the smaller strands or the smaller sutures, and thicker films may be cast and cut into wider ribbons for larger strands or larger sutures or for use in the strings of musical instruments or sports equipment such as tennis rackets, as may be desired.

The long continuous uniform strands are of particular utility in the stringing of sports equipment such as tennis rackets because the strand is essentially continuous rather than formed from a plurality of shorter elements, and as such have greater strength, greater uniformity, and greater reliability.

The composition of the material to be cast may vary depending upon the form in which it is prepared and its use. Different plasticizers or chromicizing agents may be introduced into the film as it is cast, or in subsequent treatment different concentrations may be used, and different subsequent treatments may be utilized.

Whereas described primarily in conjunction with the casting of collagen for sutures, the present casting machine and method may be used in the casting of any liquid which forms a thin film in which uniformity and reliability of the film characteristics are regarded as an essential attribute. Whereas wax is particularly useful in the casting of sutures from collagen, other casting surfaces may be used which are inert towards and preferably slightly sticky towards a particular material to be cast.

If the cutting knife is accurately positioned, the surface of the wax may be only slightly cut, and may be restored by wiping with a solvent moistened rag to smooth over the surface.

I claim:

A collagen film of uniform thickness characterized by a substantial orientation of collagen fibers in a single direction and a tensile strength in the direction of orientation at least about 1.6 times the tensile strength in a direction perpendicular to the direction of orientation; produced by centrifuging an acid dispersion of collagen fibers to form a film, continuing to centrifuge until the dispersing liquid has been substantially removed from the film and removing the film so obtained from the centrifuge.

References Cited by the Examiner

UNITED STATES PATENTS

| | | |
|---|---|---|
| 3,014,024 | 12/1961 | Lieberman et al. |
| 3,036,341 | 5/1962 | Taylor _____ 18—58.3 |

ALEXANDER H. BRODMERKEL, *Primary Examiner.*

WILLIAM J. STEPHENSON, MICHAEL V. BRINDISI,
*Examiners.*

C. B. HAMBURG, K. W. VERNON, F. S. WHISENHUNT, *Assistant Examiners.*